(12) United States Patent
Bennett et al.

(10) Patent No.: US 8,839,004 B1
(45) Date of Patent: Sep. 16, 2014

(54) SECURE CLOUD COMPUTING INFRASTRUCTURE

(75) Inventors: David W. Bennett, Longmont, CO (US); Jeffrey M. Mason, Eldorado Springs, CO (US)

(73) Assignee: IOnU Security, Inc., Longmont, CO (US)

( * ) Notice: Subject to any disclaimer, the term of this patent is extended or adjusted under 35 U.S.C. 154(b) by 23 days.

(21) Appl. No.: 13/447,766

(22) Filed: Apr. 16, 2012

(51) Int. Cl.
*G06F 12/14* (2006.01)

(52) U.S. Cl.
USPC .............................. 713/193; 713/189; 726/36

(58) Field of Classification Search
None
See application file for complete search history.

(56) References Cited

U.S. PATENT DOCUMENTS

| | | | |
|---|---|---|---|
| 5,937,063 A * | 8/1999 | Davis ............................ | 713/187 |
| 6,978,365 B2 * | 12/2005 | England ........................ | 713/156 |
| 7,603,440 B1 * | 10/2009 | Grabowski et al. ........... | 709/220 |
| 7,624,261 B2 * | 11/2009 | Volp ................................. | 713/2 |
| 2006/0179302 A1 * | 8/2006 | Hatakeyama ................. | 713/164 |
| 2007/0288740 A1 * | 12/2007 | Dale et al. ......................... | 713/2 |
| 2009/0204801 A1 * | 8/2009 | Smith et al. ..................... | 713/1 |
| 2011/0302400 A1 * | 12/2011 | Maino et al. ..................... | 713/2 |
| 2012/0005484 A1 * | 1/2012 | Furusawa et al. ............. | 713/189 |
| 2012/0179904 A1 * | 7/2012 | Dunn et al. .................... | 713/155 |

OTHER PUBLICATIONS

J. Ryan Kenny, "*Raising the Bar for Security Needs: What Does "Secure Boot" Really Mean?*," Military Embedded Systems Magazine, Jul. 14, 2010.

* cited by examiner

*Primary Examiner* — Philip Chea
*Assistant Examiner* — Khoi Le
(74) *Attorney, Agent, or Firm* — Crawford Maunu PLLC

(57) ABSTRACT

In one embodiment, a system for secure application hosting is provided. The system includes a memory, a first processor coupled to the memory, a second processor coupled to the first processor via a bus, and a data storage device and a network interface coupled to the second processor. The second processor is configured to perform cryptographic processing to provide an encrypted domain, in which the network interface and data storage device operate, and an unencrypted domain, in which the processor and memory operate.

18 Claims, 4 Drawing Sheets

SECURE CLOUD COMPUTING INFRASTRUCTURE

FIELD OF THE INVENTION

One or more embodiments generally relate to cloud computing.

BACKGROUND

Cloud computing is increasingly being used to provide remote software services, data access, and storage services over a network. One cloud computing service, software as a service (SaaS), provides to users access to online third party applications, which are executed on a cloud infrastructure. SaaS applications, e.g. web-based email service, may be accessible from client devices and interfaces such as a web browser. The user does not manage or control the underlying cloud infrastructure, which includes the network, servers, operating systems, storage, or capabilities of individual applications that would impact the general user community.

Another cloud computing service, referred to as Infrastructure as a Service (IaaS), allows users to deploy and execute their own software, including operating systems and applications, on the service provider's infrastructure. The user generally does not manage or control the underlying infrastructure but has control over operating systems, storage, deployed applications, and possibly limited control of select networking components (e.g., firewalls, encryption, etc).

In cloud computing systems, security of proprietary information is a large concern. Encryption may be used to secure data in transit between a cloud server and a user device. However, securing data in cloud infrastructures can be a complex task. Attacks or tampering intended to obtain private data stored within the cloud infrastructure may originate not only from outside the system (e.g., a side-channel attack by third party not using the architecture), but also from other users of the cloud infrastructure or employees of the service provider.

One or more embodiments may address one or more of the above issues.

SUMMARY

In one embodiment a system for secure application hosting is provided. The system includes a memory, a first processor coupled to the memory, a second processor coupled to the first processor via a bus, and a data storage device and a network interface coupled to the second processor. The second processor is configured to transfer data between an unencrypted domain of the first processor and memory, and an encrypted domain of the data storage device and network interface. The second processor decrypts encrypted first data received by the network interface and addressed to the first processor, and sends the decrypted first data to the first processor. The second processor encrypts second data to be sent to the network interface from the first processor, and sends the encrypted second data to the network interface. The second processor encrypts third data to be written to the data storage device by the first processor, and writes the encrypted third data to the data storage device. The second processor decrypts fourth data requested by the first processor to be retrieved from the data storage device, and sends the decrypted fourth data to the first processor.

In another embodiment a method for application hosting is provided. In response to receiving encrypted first data by a network interface and addressed to a second processor, the encrypted first data is decrypted using a first processor and sent to the second processor. In response to unencrypted second data to be sent to a network interface from the second processor, the second data is encrypted using the first processor and sent to the network interface. In response to third data to be written to a data storage device from the second processor, the third data is encrypted using the first processor and written to the data storage device. In response to a request from the second processor to retrieve fourth data from the data storage device, the fourth data is retrieved from the data storage device, decrypted using the first processor, and sent to the second processor.

In yet another embodiment, a method for application hosting is provided. A decryption key is received at a first processor via a network connection and an encrypted boot image is received from a data storage device by the first processor. The boot image is decrypted with the first processor using the decryption key. The decrypted boot image is executed with a second processor.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings in which:

FIGS. 4-1 and 4-2 show computing arrangements having a trusted security processor arranged as an intermediary between components operating in an unencrypted domain and other components that operate in an encrypted domain.

DETAILED DESCRIPTION

Figure 1:
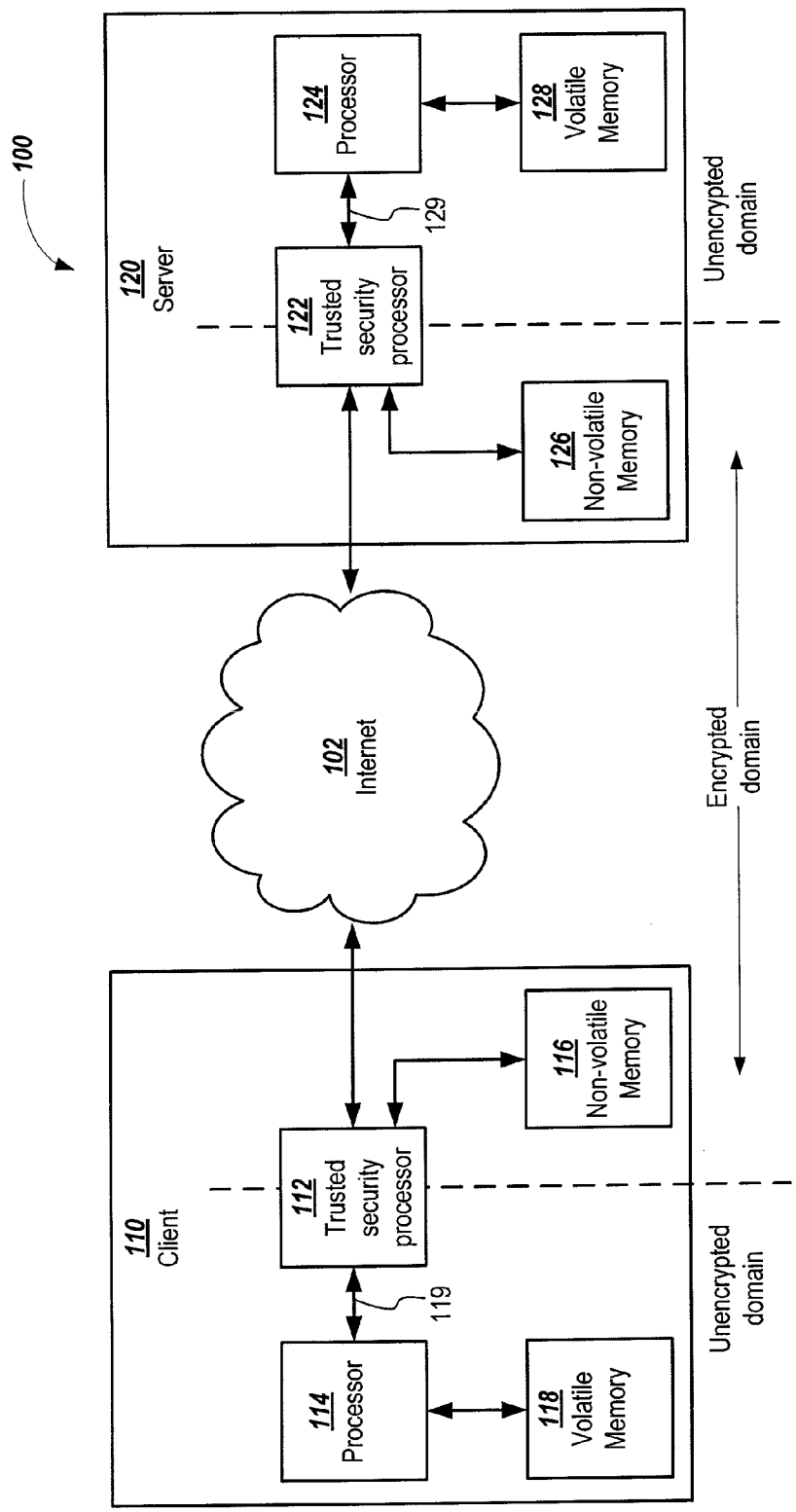
FIG. 1 shows a secure cloud infrastructure system in accordance with one or more embodiments.

Sensitive data in cloud infrastructures is susceptible to intrusion from both external and internal sources. For example, in a typical cloud infrastructure server, a processor may be taken over by an attacker to monitor data located in a memory or transmitted on a data bus of the system. The attacker may further monitor processes executed and data accessed on a compromised processor of the cloud infrastructure. Client devices used to access the cloud infrastructure are similarly susceptible. One type of attack may configure a server or client device to execute compromised code, referred to as a root kit, prior to loading an operating system or application used by the system. Once the root kit is installed, the root kit may mask ongoing intrusion and maintain privileged access to the computer by circumventing authorization mechanisms implemented by the operating system.

Some previous methods to increase security of operating systems use digitally signed binaries of operating systems to test whether operating system code has been modified by an attacker. However, such systems remain susceptible to attacks on the verification procedure, which may be circumvented by a root kit. These methods of security also fail to protect propriety or other sensitive data that may be included in the operating system file. Furthermore, these methods are complex to implement and cumbersome to administer, particularly when many virtual servers managing multiple and diversified data are available to the users in a cloud infrastructure.

One or more embodiments provide methods and systems to secure booting and execution of a user operating system or application within a cloud based infrastructure. For ease of reference, operating systems, applications, and other programs that may be booted and executed on behalf of a user in a cloud infrastructure may be referred to as a boot image. Computing systems used to implement the cloud infrastructure may also be referred to as servers, and computing systems allowing users to access the cloud infrastructure are referred to as clients.

Communication and non-volatile storage of user data, including boot images, is performed in an encrypted format. Processors of the clients and servers cannot access the encrypted data directly. Rather, encrypted data to be used by a processor is decrypted by a trusted security processor. Likewise, outgoing data from the processor to be communicated or stored in non-volatile memory is encrypted by the trusted security processor. The encryption and decryption by the trusted security processor is performed with user-specific cryptographic keys that can only be accessed by the trusted security processor. In this manner, the trusted security processor acts as an intermediary between a portion of the system that processes data in unencrypted form and a portion of the system that processes the data in an encrypted form. For ease of reference, the portion of the system that processes data in the encrypted form may be referred to as an encrypted domain and the portion of the system that processes data in the unencrypted form may be referred to as an unencrypted domain.

When a boot image is to be executed, the trusted security processor retrieves the cryptographic key(s) corresponding to the user, which are used to decrypt all data input to and output from the unencrypted domain. For example, an encrypted boot image is decrypted by the trusted security processor using the cryptographic key, and the decrypted boot image is used to boot the operating system. Because all data input to the unencrypted domain of the processor is decrypted by the trusted security processor using the cryptographic key(s) of the user, compromised code (e.g., a root kit) is prevented from being executed by the processor.

In one or more embodiments, physical access to each server during operation is prevented using physical countermeasures, such as interlock switches that power down the server when access panels are opened. Because all non-volatile storage of sensitive user data is encrypted, use of interlock switches can prevent an attacker from physically probing the processor or volatile memory operating in the unencrypted domain of the server to access sensitive data.

FIG. 1 shows a secure cloud infrastructure system. On a server 120, the system includes a processor 124 and volatile memory 128, coupled thereto, each operating in an unencrypted domain. The system includes a network interface (not illustrated) and non-volatile data storage 126 that operate in an encrypted domain. A trusted security processor 122 is coupled to the processor 124 via a data bus 129. The trusted security processor 122 acts as an intermediary between the encrypted and unencrypted domains on the server 120 of the system.

On the client 110, the system includes a network interface (not illustrated) and non-volatile data storage 116 that operate in an encrypted domain. A trusted security processor 112 of the client 110 is coupled to the processor 114 via a data bus 119. The trusted security processor 112 acts as an intermediary between the encrypted and unencrypted domains on the client 110 of the system. For example, each of the trusted security processors 112 and 122 is configured to decrypt encrypted data addressed to the processors 114 and 124 that is received via the Internet 102, or other network, and send the decrypted result to the processors 114 and 124, respectively. For ease of reference, the Internet may encompass or refer to local area networks that may be used to transmit data between client 110 and server 120. The trusted security processors are also configured to encrypt and send data from the respective processors to the network interface. As another example, the trusted security processors are configured to retrieve and decrypt data from the non-volatile memories 116 and 126 in the encrypted domain in response to requests from the processors 114 and 124. The trusted security processors are also configured to encrypt data from the processors that is to be written to the non-volatile memories in the encrypted domain.

In one or more embodiments, the server 120 is configured to securely load and execute a boot image in response to a request from the client 110. For example, in response to a request from a client 110, the trusted security processor 122 may be configured to retrieve an encrypted boot image from the non-volatile storage 126 and decrypt the encrypted boot image. The trusted security processor 122 decrypts the boot image using a user-specific cryptographic key, and the processor 124 is booted using the decrypted boot image. The cryptographic key(s) used for encryption or decryption may be provided by the client or may be stored on the server and securely retrieved in response to a user request from the client.

In some embodiments, one or more encrypted boot images may be stored in non-volatile memory 126 of a server, and retrieved and decrypted in response to a user command from a client. In some other embodiments, an encrypted boot image may be provided to the trusted security processor 122, via the Internet 102, as part of a client request sent from the client 110 to the server 120. In some implementations, one or more client commands may cause a user-specified operating system to be booted and a user-specified application to be executed on the operating system. As with the boot image, the user-specified applications may be stored in non-volatile memory 126 of the server 120 or may be provided at run-time, via the Internet 102, from the client 110.

Figure 2:
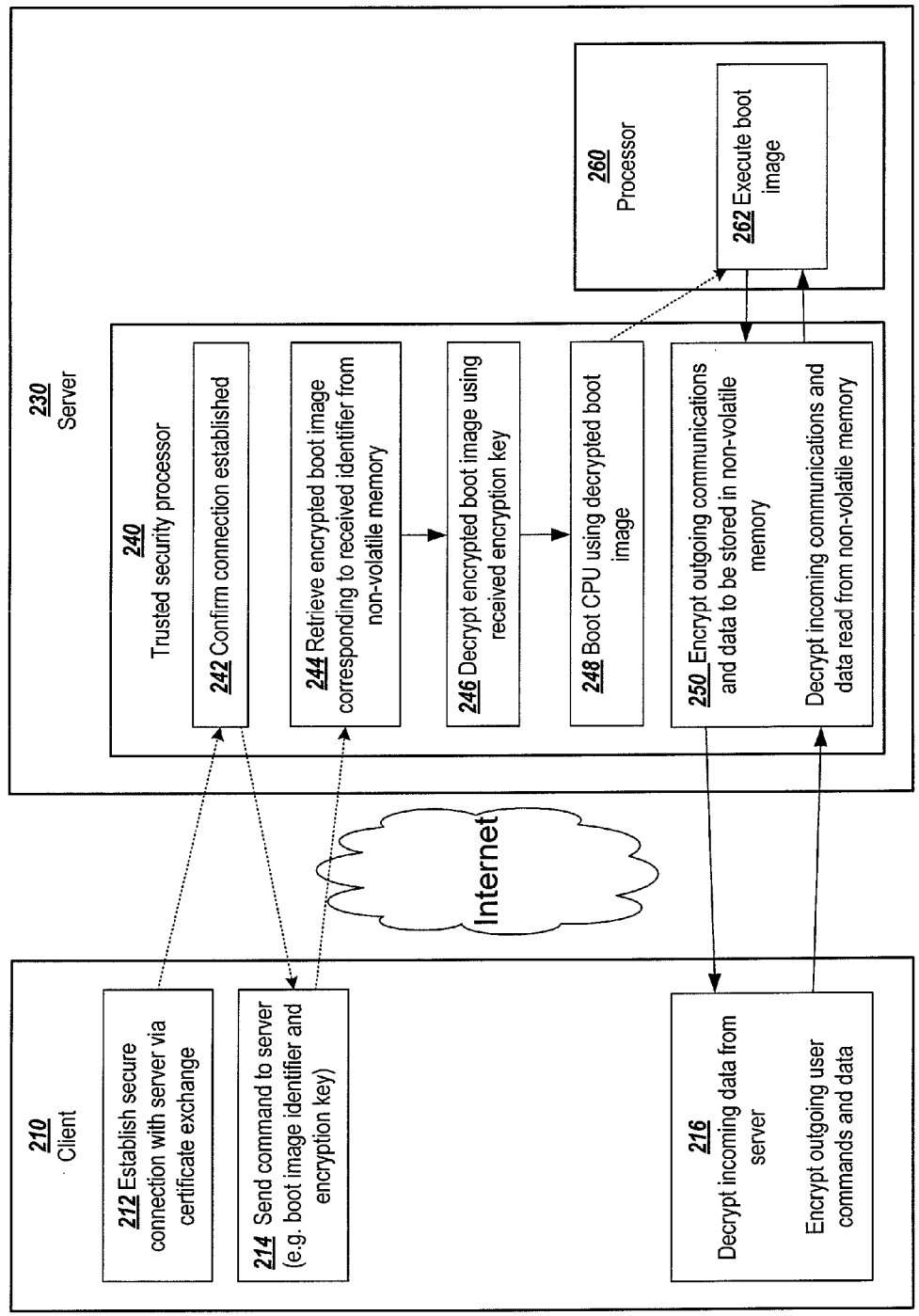
FIG. 2 illustrates a flow of data and operations between a client and server to initiate execution of a boot image in accordance with one or more embodiments.

FIG. 2 illustrates a flow of data and operations between a client and server to initiate execution of a boot image in accordance with one or more embodiments. The client 210 establishes a secure connection with server 230 at block 212, and the server confirms the connection has been established at block 242. The secure connection may be established using a certificate exchange server to exchange encryption/decryption keys. A secure connection may be implemented using various encryption and transportation protocols and/or handshake schemes. In addition, data transmitted over the secure connection may be further encrypted using one or more additional cryptographic keys, which may include one or more user-specific cryptographic keys for boot images.

After a secure connection is established, the client 210 sends a command to the server at block 214. In this example, the command includes a boot image identifier and a corresponding encryption key. Once the command is received, the trusted security processor 240 of the server 230 retrieves an encrypted boot image corresponding to the boot image identifier from a non-volatile memory at block 244. The trusted security processor decrypts the boot image at block 246. As discussed above, the boot image may provide an operating system or virtual machine environment that can be securely booted without being compromised by root kits and other threats that might be loaded prior to booting a system. In some other applications, the selected boot image may correspond to an application that is executed directly on the processor. The decrypted boot image is used to boot processor 260 of server 230 at block 248. The processor 260 executes the boot image at block 262.

As described above, a trusted security processor 240 acts as an intermediary between the unencrypted domain of the processor 260 and components in the encrypted domain of other components (e.g., network interface, non-volatile memory, etc.) of the server. The outgoing data from the unencrypted domain to be transmitted over the Internet 102 or stored in non-volatile memory are encrypted at block 250 by the trusted security processor 240. Conversely, incoming communications from the Internet and data read from data storage are also decrypted at block 250 by the trusted security processor. Likewise, on the client 210, incoming data from server 230 is decrypted and outgoing user commands and data are encrypted at block 216.

Commands and data are exchanged by the client 210 and server 230 as needed during execution of the boot image at blocks 216 and 250. It is recognized that the format and sequence of commands and data exchanged by the client and server during execution of the boot image will depend on the tasks performed by the boot image that is executed.

Figure 3:
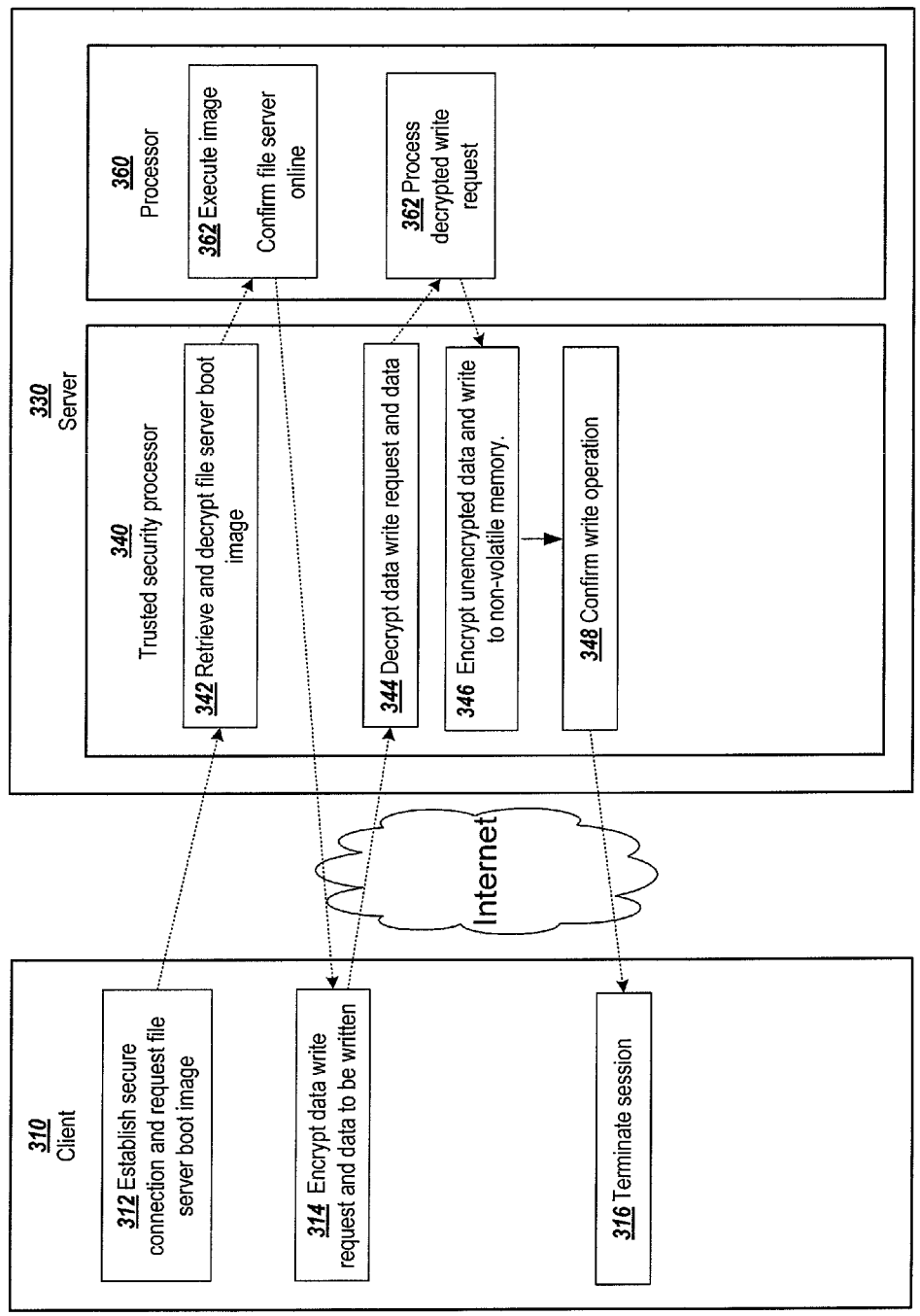
FIG. 3 illustrates dataflow between a client and server during execution of a boot image that is configured to implement a file server in accordance with one or more embodiments.

FIG. 3 illustrates dataflow between a client and server during execution of a boot image that is configured to implement a file server in accordance with one or more embodiments. Blocks 312, 342 and 362 summarize initiation and booting of a boot image as described above with respect to FIG. 2. A secure connection is established and a boot image corresponding to a file server is requested by the client 310 at block 312. When received, the trusted security processor 340 of the server 330 retrieves and decrypts an encrypted boot image for the requested file server at block 342. The decrypted boot image is executed by the processor 360 of the server 330 at block 362, which confirms that the file server is online.

After receiving confirmation that the file server is online, at block 314, the client 310 encrypts a data write request and data to be written. In response to receiving the data write request and encrypted data, at block 344, the trusted security processor 340 decrypts the data write request and data and forwards the decrypted request and data to the processor 360. Processor 360 processes the decrypted write request at block 362. The unencrypted data is re-encrypted by the trusted security processor at block 346 and written to non-volatile memory. When finished, the write operation is confirmed at block 348. The session is terminated by the client at block 316.

Figures 1, 4:
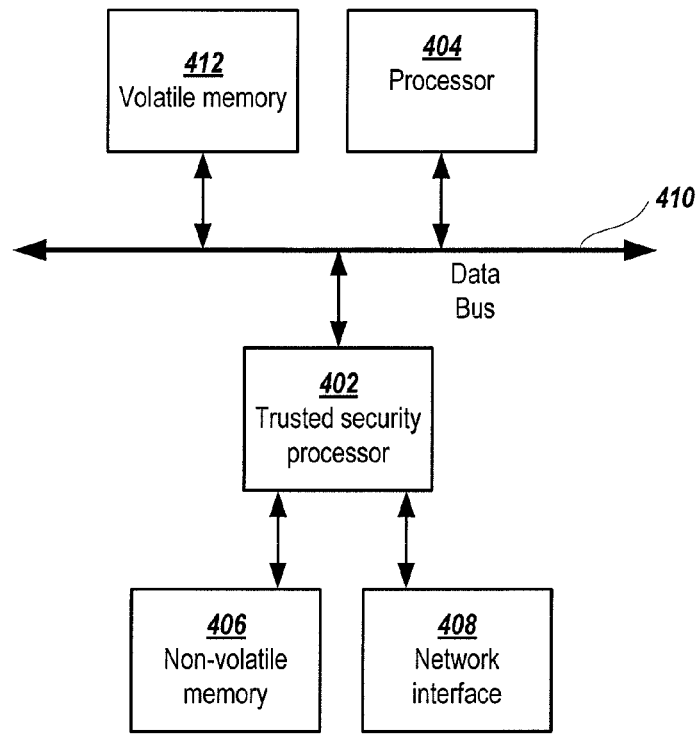
Figures 2, 4:
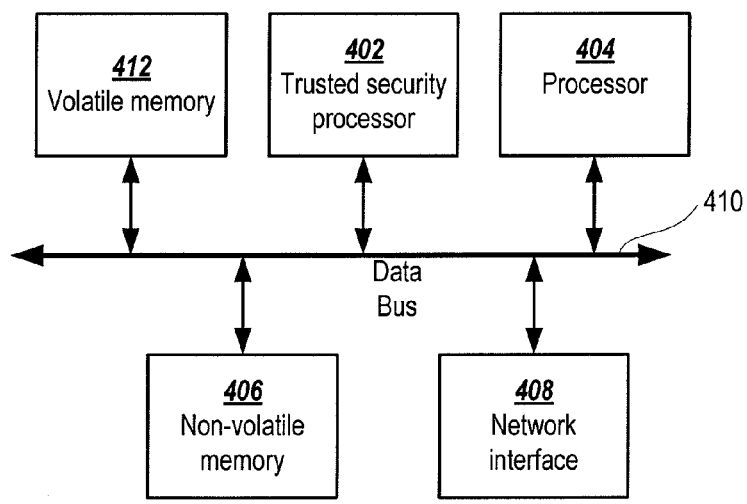

The trusted security processor and components of the system (e.g., processor, non-volatile storage, network interface, etc.) may be physically and/or logically arranged in a number of ways to configure the trusted security processor to act as an intermediary as described above. FIGS. 4-1 and 4-2 show two such arrangements of the trusted security processor in accordance with one or more embodiments.

FIG. 4-1 shows a computing arrangement having a trusted security processor that is physically arranged as an intermediary between components operating in an unencrypted domain (e.g., processor 404 and volatile memory 412) and other components such as storage 406 and network interface 408, which operate in an encrypted domain. In this arrangement, the trusted security processor 402 and components operating in the unencrypted domain (e.g., processor 404 and volatile memory 412) are coupled to a data bus 410. Components operating in the encrypted domain (e.g., non-volatile memory 406 and network interface 408) are coupled indirectly to the data bus 410 via the trusted security processor. Isolating the components of the encrypted domain from data bus 410 and processor 404 ensures that unauthorized code (e.g., code not encrypted with user indicated cryptographic key) cannot be executed by the processor. Additionally, isolation of components from the data bus 410 helps prevent compromised components from accessing plain text data that may be communicated on the data bus. Alternatively, the components 406 and 408, which operate in the encrypted domain, may be directly coupled to the data bus 410 and processor 404 may be coupled indirectly to the data bus 410 via trusted security processor 402.

FIG. 4-2 shows a computing arrangement having a trusted security processor as an intermediary between components operating in an unencrypted domain (e.g., processor 404 and volatile memory 412) and other components such as storage 406 and network interface 408, which operate in an encrypted domain. In this arrangement, the trusted security processor 402, processor 404, volatile memory 412, non-volatile memory 406, and network interface 408 are each coupled directly to the data bus 410. A data bus controller (not shown) may be configured to enforce addressing using trusted security processor 402 as a proxy for all data transferred between components in the encrypted domain and components in the unencrypted domain. Addressing constraints necessary to ensure that trusted security processor 402 is used as a proxy may be enforced by data bus interfaces (not shown) that communicate data between each component (e.g., 402, 404, 406, 408, and 412) and the data bus 410.

It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangements shown in FIGS. 4-1 and 4-2 include one or more processors 404, a volatile memory unit 412, a non-volatile memory 406, a network interface 408 or other input/output unit, each coupled directly or indirectly to data bus 410. The arrangements may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 402 may be one or more general-purpose processors, or a combination of one or more general-purpose processors and suitable co-processors, or one or more specialized processors (e.g., RISC, CISC, pipelined, etc.).

The non-volatile memory 406 may include local and/or remote persistent memory, such as provided by magnetic disks (not shown), flash, EPROM, or other non-volatile data storage. Remote non-volatile memory may operate in the encrypted domain of the network interface 408 or may operate in a different encrypted domain. For example, encrypted data may be communicated over a network from one server to be stored in the non-volatile memory of another server. In such an example, data would be communicated by the network interface in a first encrypted domain. The encrypted data may then be received by a second server, decrypted by another trusted security processor, analyzed by a processor, re-encrypted by the trusted security processor, and finally stored in a non-volatile memory of the second server that operates in another encrypted domain.

The interfaces between encrypted and unencrypted domains may be thought of as nodes of a network at which encryption and decryption occur. For ease of reference, these encryption/decryption nodes are referred to as bumps. As discussed above, traffic leaving a server is always encrypted and traffic entering a system is decrypted. The arrangement of bumps in the system is dependent on the type of traffic, the destination, and the system architecture. For example, if you are connecting two servers over a network, each server includes one bump establishing a secure communication connection using IPSec or other secure protocol. Any connection between unencrypted domains of two systems (e.g., client or server) includes an even number of bumps.

Conversely, any connection between the unencrypted domain of a client/server and a non-volatile storage (implemented locally or remotely) is implemented with an odd number of bumps. For example, a hard disk connected to a server would have a single bump. The data being written to the disk would be encrypted at a single bump and then stored. When read, the data would be decrypted at the single bump for use by the application running in the server. Data on that hard disk, if accessed remotely (e.g., from a client) would go through three bumps: two between unencrypted domains of the client and the server, and a third bump between the server and the hard disk.

In one or more embodiments, the trusted security processor may be configured to operate in conjuncture with one or more other hardware and/or software elements to perform the intermediary and cryptographic tasks discussed above. For example, much of the encryption and decryption operations may be performed by circuits coupled to the trusted security processor such as programmable ICs or microcontrollers. This requires an extension of trust from the trusted security processor to these other elements. The trusted security processor manages each of these other elements to provide sufficient security to ensure that data and cryptographic keys are not compromised during processing. For example, the trusted security processor may utilize a plurality of field programmable gate arrays (FPGAs) for processing data. The configuration bitstream of each FPGA may be loaded into the FPGA directly by the trusted security processor. Each FPGA may be configured with a configuration customized for a particular client and data stream being dealt with. Each configuration bitstream may be encrypted with a cryptographic key unique to the FPGA and/or user. In this manner, the additional circuits are securely configured and operated by the trusted security processor.

While the examples and embodiments are primarily described with reference to hardware implementations and arrangements of a cloud-based client or server, it is recognized that some embodiments may implement one or more components or functions of a client or server of the system using secure software.

In one or more embodiments, a client or server may be implanted using secure software such as a virtual machine. A virtual machine provides an isolated guest operating system installation within a normal host operating system using software emulation and/or hardware virtualization. As one example, VMWare™ may be used to create and run a virtual machine in accordance with one or more embodiments. Virtual machines may be particularly useful for implementation of a client using a general-purpose computer. The virtual machine is configured to implement one or more cryptographic processes that act as an intermediary between encrypted and unencrypted domains of the system, as described with reference to the trusted security processor above. For example, sensitive data communicated over a network interface is encrypted and decrypted using one or more of the cryptographic processes. Non-volatile memory may be implemented using a virtual hard drive. Data written to and from the non-volatile memory is encrypted and decrypted by the cryptographic processes.

It is recognized that such software solutions are less secure than the hardware implementations of the system. To prevent the cryptographic processes of the virtual machine from becoming compromised or circumvented, one or more embodiments may receive the cryptographic processes from a server over a secure communication connection when the virtual machine is booted. At start up of the virtual machine, a secure communication connection is initiated to a secure server of the cloud infrastructure. At the time the connection is initiated, a set of user credentials may be required to verify the identity of the server and virtual machine and establish the secure communication connection. The credentials also provide an additional level of protection so that if a computer implementing the virtual machine falls is stolen or lost, an intruder not having the credentials will still be unable to access the system.

Once a secure connection is established, the secure server provides the virtual machine with the cryptographic processes to be used for each device that operates in the encrypted domain of the system (e.g., non-volatile storage devices). The cryptographic processors may be implemented differently depending on the implementation of the system. For example, the processes may be executed on a general-purpose processor, or may be performed using hardware configured to perform the cryptographic processes. For example, in some implementations, the cryptographic processor indicates cryptographic keys to be used but also may include code to perform the cryptographic processes. This code may include, for example, an FPGA bitstream or a DLL that is loaded into a hypervisor of the virtual machine. Further, in some embodiments, the virtual machine may be configured to change the cryptographic functions periodically.

In one or more embodiments, the virtual machine is prevented access from the internet. As a result, the client will be prevented from accessing unsecured networks (e.g., the public internet) while connected to the cloud infrastructure. The computer hosting the virtual machine may be configured to allow the user to switch between the virtual machine connected to the cloud infrastructure and a second virtual machine that may establish a connection to an unsecured network. This will allow the user to quickly switch between internet based applications and applications implemented in the cloud infrastructure.

In one or more embodiments, additional security processes may be employed to detect and/or prevent tampering of the virtual machine code. The processes may rotate or evolve over time. For example, some attacks may insert malicious code. During compilation, a compiler may determine locations and functions, which perform sensitive operations (e.g., external communication of data). After booting the virtual machine, sensitive operations can be monitored to make sure the operations are only performed from the expected locations and functions. Sensitive operations performed from another location may be flagged as a detection of malicious code. As another example, a device of the cloud infrastructure may periodically prompt a virtual machine to respond with the value of a memory location of the virtual machine program. The prompting device may compare the response with an expected value to determine if the memory location has been modified by an attacker. Other security processes known in the art may be incorporated as well.

The embodiments are thought to be applicable to a variety of cloud infrastructure having other arrangements as well. Other aspects and embodiments will be apparent to those skilled in the art from consideration of the specification. It is intended that the specification and illustrated embodiments be considered as examples only, with a true scope of the invention being indicated by the following claims.

What is claimed is:

1. A system for secure application hosting, comprising:
a data bus;
a memory directly coupled to the data bus;
a first processor directly coupled to the data bus;
a second processor directly coupled to the data bus;
a data storage device coupled to the second processor; and
a network interface coupled to the second processor;
wherein:
the memory and first processor operate in an unencrypted domain, and the data storage device and network interface operate in an encrypted domain; and
the second processor operates as an intermediary between the encrypted domain and the unencrypted domain and is configured and arranged to:
decrypt encrypted first data received by the network interface and addressed to the first processor, and send the decrypted first data to the first processor;
encrypt second data to be sent to the network interface from the first processor, and send the encrypted second data to the network interface;
encrypt third data to be written to the data storage device by the first processor, and write the encrypted third data to the data storage device; and
decrypt fourth data requested by the first processor to be retrieved from the data storage device, and send the decrypted fourth data to the first processor;
wherein in response to a request from a third processor received via the network interface to execute an application, the second processor is configured and arranged to:
retrieve from the data storage device, an encrypted boot image that is associated with the third processor;
decrypt the encrypted boot image using a decryption key included in the request to execute the application; and
boot the first processor using the decrypted boot image.

2. The system of claim 1, wherein the decrypted boot image includes executable code of the application.

3. The system of claim 1, wherein the decrypted boot image includes executable code of an operating system.

4. The system of claim 3, wherein:
the request to execute the application includes application program code; and
booting the first processor with the decrypted boot image causes the first processor to execute the application program code.

5. The system of claim 1, wherein, while the first processor is executing the decrypted boot image, the second processor is configured to:
encrypt the third data using an encryption key with which the encrypted boot image was encrypted, and write the encrypted third data to the data storage device; and
decrypt the fourth data requested by the first processor using the decryption key used to decrypt the encrypted boot image, and send the decrypted fourth data to the first processor.

6. The system of claim 1, wherein the second processor communicates with the first processor, data storage device, and network interface over the data bus.

7. The system of claim 1, wherein the data storage device and network interface are coupled to the data bus via the second processor.

8. A method for application hosting, comprising:
in a system having a first processor configured as an intermediary between an encrypted domain and an unencrypted domain, the unencrypted domain including a memory and a second processor directly coupled to a data bus, and the encrypted domain including a data storage device and a network interface, operating the first processor to perform operations including:
in response to encrypted first data received from the network interface in an encrypted domain and addressed to the second processor in an unencrypted domain, decrypting the encrypted first data and sending the decrypted first data to the second processor via the data bus;
in response to unencrypted second data received from the second processor via the data bus and to be sent to the network interface, encrypting the second data and sending the encrypted second data to the network interface;
in response to third data received from the second processor via the data bus and to be written to the data storage device in an encrypted domain, encrypting the third data and writing the encrypted third data to the data storage device; and
in response to a request received from the second processor via the data bus to retrieve fourth data from the data storage device, retrieving the fourth data from the data storage device, decrypting the fourth data, and sending the decrypted fourth data to the second processor via the data bus;
in response to receiving a decryption key via the network interface:
retrieving an encrypted boot image from the data storage device; and
decrypting the encrypted boot image using the decryption key; and
executing the decrypted boot image with the second processor.

9. The method of claim 8, wherein the decryption key indicates a particular user application and the decrypted boot image contains executable code corresponding to the particular user application.

10. The method of claim 8, wherein the data storage device includes a plurality of boot images encrypted with the decryption key, each of the plurality of boot images corresponding to a different user application.

11. The method of claim 8, further comprising:
wherein the receiving the decryption key includes receiving a user command and the
decryption key associated with the user command.

12. The method of claim 11, wherein:
the decrypted boot image is an operating system;
the user command indicates a user application; and
the decrypted boot image, when executed by the second processor causes the second processor to execute the user application on the operating system.

13. The method of claim 12, wherein the user command includes the user application.

14. A method for application hosting, comprising:
in a system having a first processor configured as an intermediary between an encrypted domain and an unencrypted domain, the unencrypted domain including a memory and a second processor directly coupled to a data bus, and the encrypted domain including a data storage device and a network interface, receiving a decryption key at the first processor from the network interface;

retrieving an encrypted boot image from the data storage device by the first processor;

decrypting the encrypted boot image by the first processor using the decryption key;

executing the decrypted boot image by the second processor;

outputting data from the second processor via the data bus to be transmitted over the network interface;

encrypting the output data by the first processor; and providing the encrypted output data from the first processor via the data bus to the network interface.

15. The method of claim 14, further comprising, in response to receiving encrypted data by the first processor from the network interface:

decrypting the encrypted data by the first processor; and providing the decrypted data to the second processor via the data bus.

16. The method of claim 14, further comprising, in response to the second processor issuing a read request for data from the data storage device:

retrieving data referenced by the read request from the data storage device by the first processor;

decrypting by the first processor, the data retrieved from the data storage device; and providing the data decrypted by the first processor to the second processor via the data bus.

17. The method of claim 14, further comprising, in response to the second processor issuing via the data bus a write request to write data to the data storage device:

encrypting data specified in the write request with the first processor; and storing the encrypted data in the data storage device with the first processor.

18. The system of claim 6, wherein the data bus is configured to address the second processor for all data transfers between the encrypted domain and the unencrypted domain.

* * * * *